United States Patent
Ito et al.

(10) Patent No.: US 6,926,982 B2
(45) Date of Patent: Aug. 9, 2005

(54) FUEL CELL (75) Inventors: Yasumitsu Ito, Hamamatsu (JP);
Yoshifumi Takai, Hamamatsu (JP);
Takeshi Ishikawa, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 429 days.

(21) Appl. No.: 10/137,708

(22) Filed: May 2, 2002

(65) Prior Publication Data

US 2002/0172844 A1 Nov. 21, 2002

(30) Foreign Application Priority Data

May 8, 2001 (JP) ........................................ 2001-137614

(51) Int. Cl.[7] .......................... H01M 8/18; H01M 8/10; H01M 2/00; H01M 2/02
(52) U.S. Cl. .............................. 429/21; 429/32; 429/34; 429/19; 204/DIG. 4
(58) Field of Search .............................. 429/19, 21, 32, 429/34; 204/DIG. 4

(56) References Cited

U.S. PATENT DOCUMENTS 4,839,247 A * 6/1989 Levy et al. ................... 429/21

FOREIGN PATENT DOCUMENTS

| DE | 199 27 849 A1 | * 12/1999 | |
| JP | 2002-252017 | * 9/2002 | ............ H01M/8/06 |

* cited by examiner

Primary Examiner—Stephen Kalafut
Assistant Examiner—Julian Mercado
(74) Attorney, Agent, or Firm—Myers Bigel Sibley & Sajovec, P.A.

(57) ABSTRACT

A polymer electrolyte fuel cell composed of a plurality of unit cells stacked one after another, which comprises: a water electrolysis portion and a fuel cell portion disposed in the single plane of each unit cell; an oxygen electrode disposed on one side of a proton exchange membrane and a hydrogen electrode disposed on the other side in the stacking direction of the unit cells; a diffusion layer disposed on both sides of each electrode for allowing generated electrons to pass through; interconnectors disposed outside the diffusion layers and having a gas passage for feeding the fuel cell portion with a gas; and a water passage disposed in the interconnector on the side of the oxygen electrode for feeding the water electrolysis portion with water. A fuel cell system and a production process of thereof are also disclosed.

11 Claims, 11 Drawing Sheets

FIG.7 (a) (BEFORE PRESSING)

FIG.7 (b) (AFTER PRESSING)

FUEL CELL

CROSS-REFERENCE TO RELATED APPLICATIONS

The present application claims priority to Japanese Patent Application No. 2001-137614, filed May 8, 2001, the disclosure of which is incorporated herein by reference in its entirety.

BACKGROUND OF THE INVENTION

The present invention relates to a fuel cell and a system thereof. More specifically, the invention pertains to a reversible type polymer electrolyte fuel cell capable of treating a regenerative current and a system thereof.

Figure 2:
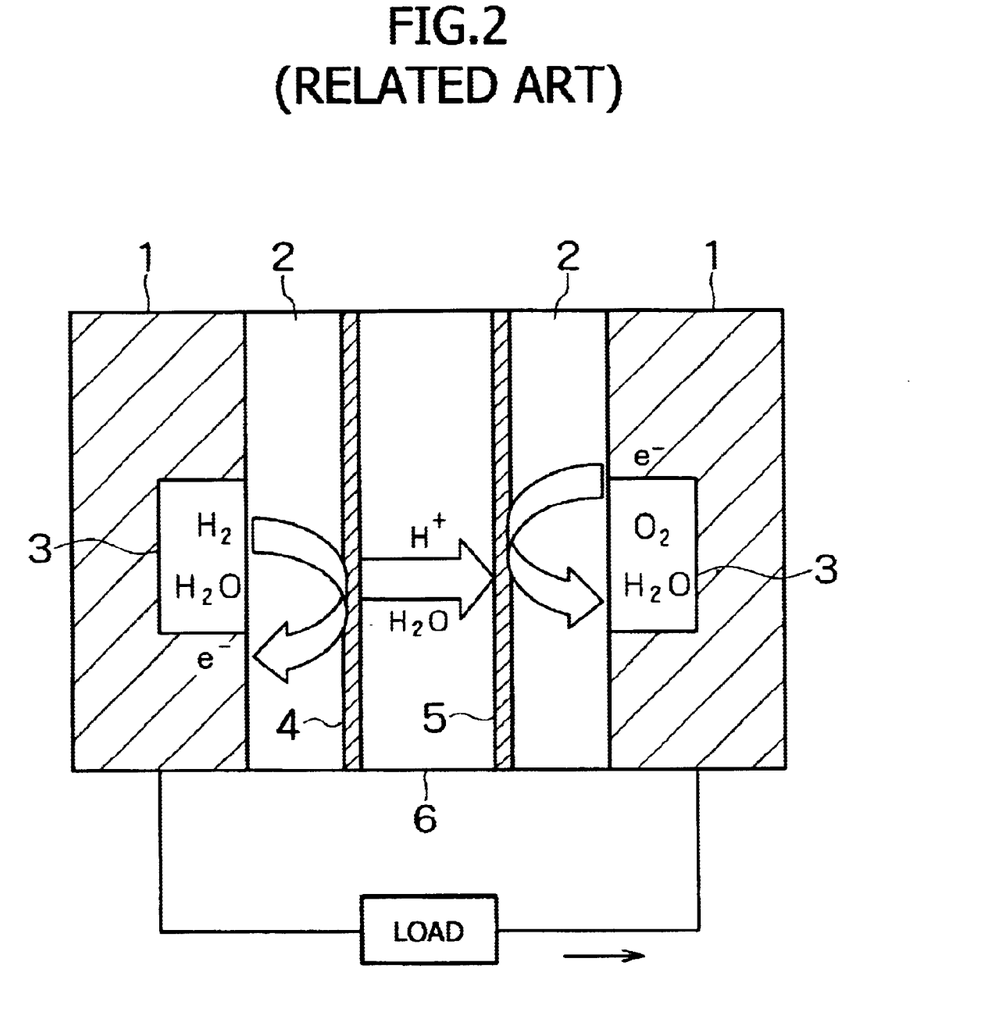
FIG. 2 is a cross-sectional view illustrating the constitution in a unit cell which is a fundamental component of a conventional fuel cell.

FIG. 2 is a schematic view illustrating the constitution of a conventional polymer electrolyte fuel cell.

As an ion exchange membrane which is a main component of the polymer electrolyte fuel cell, a cation exchange membrane called a "proton exchange membrane" 6 is usually employed. Catalyst layers 4,5 are disposed on both sides of this proton exchange membrane 6. As these catalyst layers 4,5, a paste having a platinum or platinum alloy catalyst borne on carbon particles is often used. A gas diffusion layer 2 is disposed on the outside of each catalyst layer. This diffusion layer 2 is usually made of carbon paper and it is also called collector layer through which electrons generated on the catalysts are allowed to pass.

On the outside of the gas diffusion layer, there exists a plate having a gas channel 3 therein, and it is called "interconnector" 1. The interconnector 1 is made of a current-carrying substance and has the function of separating a fuel gas from an oxidizing gas. The fuel gas is usually composed of hydrogen gas and water vapor. The catalyst layer brought into contact with this hydrogen-gas-containing fuel gas is called "hydrogen electrode". The term "oxidizing gas" as used herein means an oxygen containing gas such as air and the catalyst layer brought into contact with an oxidizing gas is called "oxygen electrode".

When this solid electrolyte fuel cell is connected with an external load, a hydrogen gas ($H_2$) is decomposed into protons ($H^+$) and electrons ($e^-$) at the hydrogen electrode 4 and the protons transfer through an electrolyte membrane toward the oxygen electrode 5 side. After the transfer, the protons combine with oxygen ($O_2$) and electrons, which have flown into the oxygen electrode 5 side, to produce water ($H_2O$) on this side. Fuel cells circulate electrons ($e^-$), which have been exchanged during water formation reaction processes through an external circuit, thus acting as a battery.

At this time, protons ($H^+$), together with water molecules therearound, transfer in the form of clusters. This is so called electroendosmosis of water. With this phenomenon, the membrane on the hydrogen electrode 4 side dries up. For the transfer of protons, existence of water is indispensable. On the dried film surface, ion resistance increases and disturbs the passage of ions. In order to overcome this problem, the hydrogen gas at the hydrogen electrode 4 is usually fed with externally humidification ($H_2+H_2O$), which suppresses an increase in electric resistance caused by the drying of the membrane. Water carrying capacity of the hydrogen gas depends on the water vapor pressure. The higher the gas temperature, the greater the water vapor pressure and a larger amount of water can be fed into the fuel cell.

An excessive rise of water vapor pressure, on the contrary, decreases the partial pressure of hydrogen ($H_2$) itself, thereby exerting a bad influence on the performance of the fuel cell. The amount of water to be supplied from the outside externally therefore has a certain limit.

At the oxygen electrode 5, an amount of water becomes excessive owing to electroendosmosis of water and generation of water. This creates a water concentration gradient between the hydrogen electrode 4 side and oxygen electrode 5 side of the membrane, leading to a phenomenon called "back diffusion" which is physical diffusion of water toward the hydrogen electrode 4. A portion of this excessive water is exhausted outside by evaporation as a gas at the oxygen electrode 5.

If more water exists, however, it cannot be controlled by evaporation or diffusion and overflows as condensed water through the diffusion layer 2 or gas passage 3 of the interconnector 1. This phenomenon is called "flooding", which prevents oxygen gas from reaching the membrane 6, thereby deteriorating the performance of the fuel cell.

Some countermeasures have been studied in consideration of the above-described problems, but they are not completely free from the problems.

Ordinarily employed external humidification involves the above-described problem. Physical or mechanical circulation of water within stacks has also some problems. As other countermeasures, (1) the promotion of back diffusion of water by making the membrane thinner, thereby increasing the magnitude of water concentration gradient, (2) the generation of water in the membrane, and (3) the humidification within the passage by infiltrating cooling water into the interconnector are known.

Countermeasure (1) is however accompanied with a problem of physical permeation of a raw gas called "cross flow of gas". Such a reaction arises aside from the main reaction of a fuel cell and prevents part of electrons from flowing into an external circuit. This lowers the electromotive force of the cell. In countermeasure (2), the humidity of the membrane is adjusted by dispersing the catalyst in the membrane and converting the crossflow gas into water. In this method, however, pinholes appear in the film owing to the reaction heat and deteriorate the life of the fuel cell. Countermeasure (3) involves the same problem as the one caused by the external humidification and in addition, some difficulty in gas sealing may occur.

SUMMARY OF THE INVENTION

With the above-described problems in view, the present inventors have carried out an extensive investigation with a view to developing a fuel cell which can prevent the lowering of power generation efficiency by avoiding a flooding phenomenon caused by excessive water, is free from the problem of cross-flow of gas, and has a prolonged life owing to efficient water removal attained by avoiding a reduction of electromotive power or bad influences on the proton exchange membrane.

As a result, the present inventors have found that the above-described problems can be overcome by producing a reversible type fuel cell capable of treating a regenerative current by disposing, inside the unit cell, a water electrolysis portion equipped with a water passage. The present invention has been completed based on such a finding.

The present invention provides a polymer electrolyte fuel cell having a plurality of unit cells stacked one after another, each unit cell comprising: a water electrolysis portion and a fuel cell portion in the same plane of the unit cell; an oxygen electrode on one side of a proton exchange membrane and a hydrogen electrode on the other side, each being disposed in the stacking direction of the unit cells; gas diffusion layers on the outside of the electrodes so that electrons generated on a catalyst can pass through the gas diffusion layers; and interconnectors disposed further outside the diffusion layers and having a gas passage for feeding the fuel cell portion with a gas, interconnectors adjacent to the oxygen electrode having a water passage for feeding the water electrolysis portion with water. In this fuel cell, water passes through the interconnectors located next to the oxygen electrode. Each unit cell has, in a single plane, both a water electrolysis portion which serves to hydrolyze water and a fuel cell portion which serves as a fuel cell. The electrolysis portion exists on the periphery of a water passage (distributor). Such a construction makes it possible to dispose the water electrolysis portion without decreasing the electrode area of the existing fuel cell, thereby making it possible to effectively use a portion between the distributor and electrode surface which cannot otherwise be used, disturbed by sealing.

Owing to water electrolysis, the fuel cell of the present invention is a reversible type capable of treating a regenerative current. In this fuel cell, hydrogen on the hydrogen electrode side can be humidified by membrane humidification, and oxygen in the oxygen passage adjacent thereto can also be humidified. Moreover, it has a water passage on the reaction side, making it possible to cool and humidify the proton exchange membrane directly.

In the present invention, preferred embodiments include a fuel cell wherein the interconnector placed next to the oxygen electrode is equipped with an oxygen gas passage, disposed adjacent to the water passage, for receiving oxygen generated at the water electrolysis portion; and a fuel cell wherein the interconnector placed next to the hydrogen electrode is equipped with a hydrogen gas passage for receiving hydrogen generated at the water electrolysis portion. The gas passage adjacent to the water passage does not contribute to a fuel cell reaction and has less influence on the fuel cell portion because water, if any, does not directly invade thereto.

In the fuel cell of the present invention, the proton exchange membrane has two functionally separated portions: the water electrolysis portion and fuel cell portion disposed in the same plane within the unit cell. Preferred is a fuel cell wherein the proton exchange membrane at the water electrolysis portion is thicker than that of the fuel cell portion. The term "functionally separated" as used herein means not only cases wherein the proton exchange resin is physically separated between the water electrolysis portion and fuel cell portion but also cases wherein even if they are not physically separated, a difference in thickness or passage around them makes them serve different functions respectively.

In the water electrolysis portion, it is possible to interpose the oxygen electrode between the oxygen gas passage and proton exchange membrane, not between the water passage and proton exchange membrane, while disposing the hydrogen electrode between the hydrogen gas passage and proton exchange membrane. According to this embodiment, the clogging of the water pump with air can be prevented because oxygen gas is not generated on the water passage and therefore a vapor-liquid double flow is not formed; and size and cost reductions can be accomplished because the installment of a vapor-liquid separator downstream of the unit cell or stack is not necessary.

In the present invention, a fuel cell having the water passage and gas passage for feeding the fuel cell portion with a gas are preferably disposed not adjacent to each other. Such a constitution makes it possible to avoid flooding. Particularly in a parallel channel type fuel cell which tends to cause flooding, it is preferred to have the water and gas passages apart from one another. For example, in the fuel cell having the oxygen gas passage, adjacent disposal can be avoided by disposing the oxygen gas passage between the water passage and the gas passage for feeding the fuel cell portion with a gas.

In the fuel cell of the present invention, the oxygen gas passage can be connected with the gas passage which exists on the oxygen electrode side and serves to feed the fuel cell portion with a gas, or the hydrogen gas passage can be connected with the gas passage which exists on the hydrogen electrode side and serves to feed the fuel cell portion with a gas. A converging point can be designed as needed, depending on a difference in the controlling method of the fuel cell or in consideration of the uneven distribution of a current or temperature on the electrode surface so that by adjusting the humidity or oxygen hydrogen concentration of the membrane of the fuel cell, the performance of the cell can be improved further. In addition, a time lag between power production and regeneration can be reduced by once discharging a gas out of the cell through an independently disposed distributor.

The present invention also provides a fuel cell system having any one of the above-described polymer electrolyte fuel cells, which system further has, downstream of the fuel cell, a catalyst combustor for feeding a portion or whole portion of a gas generated at the water electrolysis portion. Such a construction makes it possible to improve the efficiency of the whole system by making up a portion of the heat source used to keep the fuel cell system running.

In the present invention, provided are two preferred processes for producing the above-described fuel cell wherein the proton exchange membrane is not divided but functionally separated between the water electrolysis portion and the fuel cell portion in the same plane of the unit cell, which comprises making a portion of the proton exchange membrane at the water electrolysis portion thicker compared with that at the fuel cell portion. An interconnector having an indented surface is pressed against the proton exchange membrane, which has been made thicker at a place to be a water electrolysis portion than another site by partially stacking planar proton exchange membranes one after another, while interposing, between the interconnector and the proton exchange membrane, a diffusion layer to which a catalyst layer to be a hydrogen electrode or oxygen electrode has been applied, thereby forming a stack structure in the unit cell. Another production process comprises indenting the surface of a planar and uniformly thick proton exchange membrane, pressing, against the proton exchange membrane, a diffusion layer to which a catalyst layer to be a hydrogen electrode or oxygen electrode has been applied, and forming a stack structure via an interconnector. Since the proton exchange membrane is not divided in these processes, humidification of the whole membrane can be accelerated by diffusion of water in the transverse direction. These processes can reduce the number of parts and improve assembling efficiency, leading to excellent production efficiency.

In the conventional production process, an electrolyte cell and fuel cell are not in one body, causing a size increase of the fuel cell system. According to the present invention, on the other hand, a binding plate for fixing the stack, a chassis, and a gas passage are common to these cells, making it possible to provide a compact system. In addition, the inventive system can collect a regenerative current by water electrolysis so that a battery or accumulator such as ultracapacitor, which was essential in the conventional system, is not necessary. A decrease in the number of accessories or supplementary unit cells leads to space and cost reduction of the fuel cell system.

Because each unit cell in the fuel cell of the present invention has, within the same plane, both the fuel cell portion and electrolysis portion, the ratio of the effective electrode area to the cell area may become smaller. A regenerative current is however the one-fifth or one-sixth of the powering peak current, which requires a corresponding ratio of the electrolysis surface to the fuel cell surface. The substantial influence of such a small ratio is not great. As the interconnector of the present invention, similar to the diffusion layer (power feeder), not a carbon material having low oxidation resistance but a metal plate is preferred in order to carry out water electrolysis inside the fuel cell.

The present invention will hereinafter be described more specifically with examples. It should however be borne in mind that the scope of the present invention will not be limited to or by them.

In these diagrams, indicated at reference numeral 1 is an interconnector, 2,20, each a diffusion layer (power feeder), 3 a gas passage, 4 a catalyst layer (hydrogen electrode), 5 a catalyst layer (oxygen electrode), 6 a proton exchange membrane, 7 a power feeder, 10 an ion exchange membrane, 11 an oxygen electrode side, 12 a hydrogen electrode side, 13 hydrogen gas passage, 21 a catalyst layer, 22 a membrane, 20 an insulator/packing, 31 a water hydrolysis portion, 32 a fuel cell portion, 33 a catalyst combustor, 34 a hydrogen reservoir, 35 a water passage, 36 an air inlet, 37 an exhaust port, 38 a hydrogen inlet, 39 an exhaust port, 40 a gas passage, 41 a regenerative current, A water passage and B oxygen gas passage.

DETAILED DESCRIPTION OF PREFERRED EMBODIMENTS

The present invention provides a fuel cell which carries out electrolysis of water in the plane of a unit cell of the fuel cell. One of the structural features of the present invention resides in use of an interconnector having a cooling water passage disposed on the same plane with the passage of an oxygen electrode.

Figure 3:
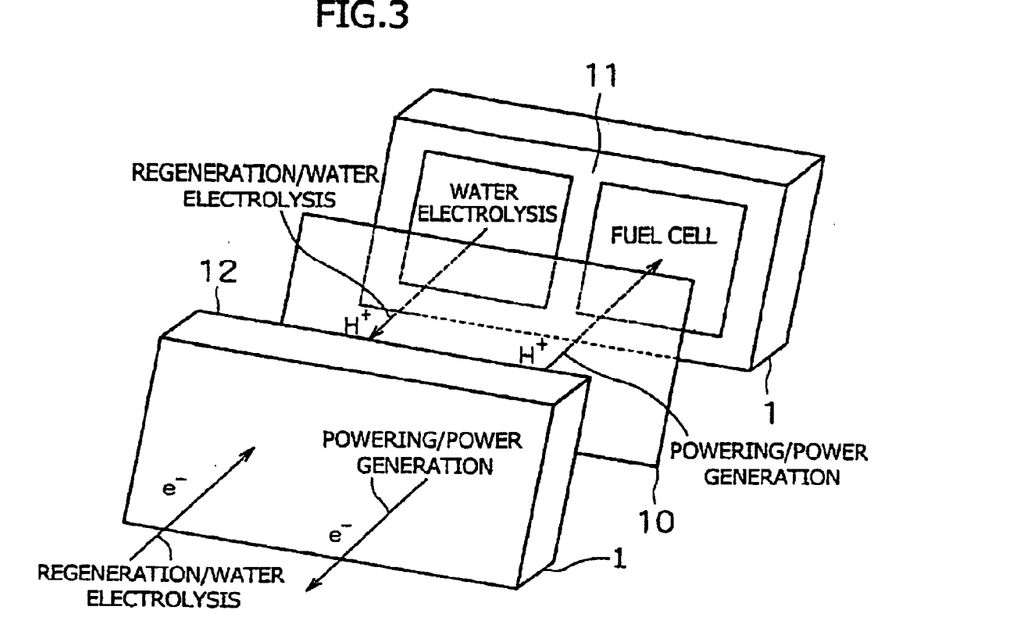
FIG. 3 schematically illustrates the actions of the fuel cell portion and water electrolysis portion.
Figure 4:
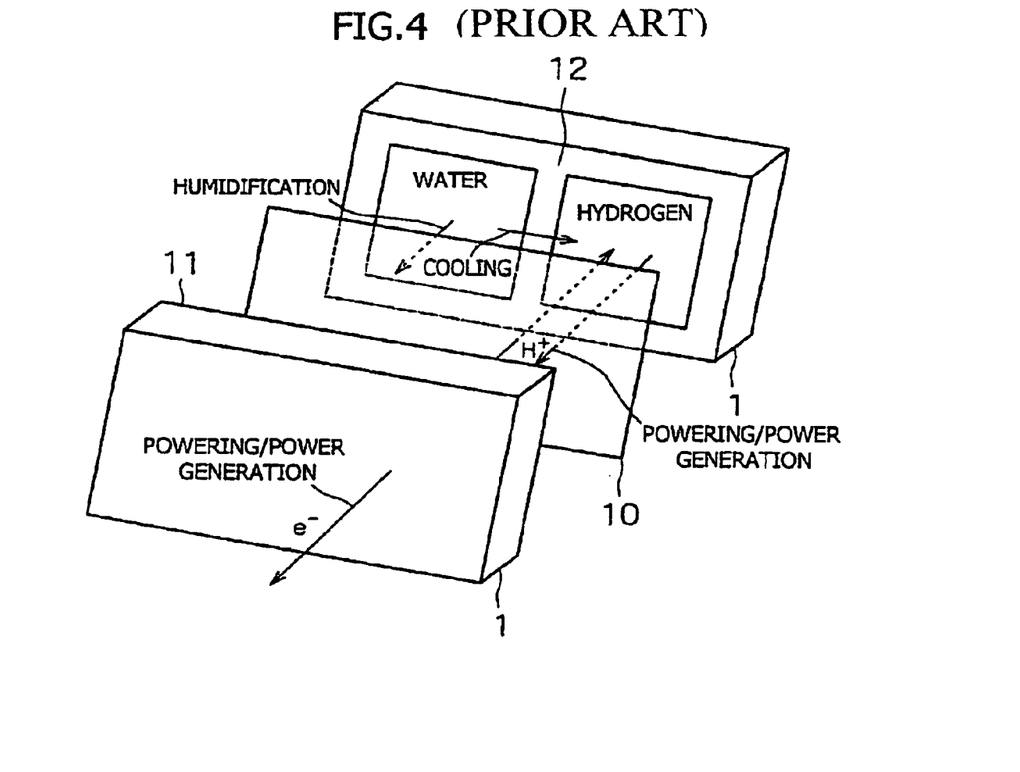
FIG. 4 schematically illustrates the action of the conventional fuel cell having a water passage.

A fuel cell as illustrated in FIG. 4 can be given as a structure similar to that of the invention fuel cell. It has a hydrogen passage and a water passage adjacent each other in the plane of the hydrogen electrode 12. Different from the invention fuel cell, however, water in this structure is mainly effective for humidification of a membrane. If electrolysis of water is carried out using this constitution, only water of the membrane near the catalyst of the oxygen electrode becomes the object of electrolysis and a diffusion rate of water in the membrane from the water passage at the hydrogen electrode becomes a problem. At an insufficient diffusion rate, the surface of the membrane at the oxygen electrode becomes excessively dry and the performance of the fuel cell is impaired. According to the constitution of the present invention, as illustrated in FIG. 3, powering or electricity generating action at the fuel cell portion and regeneration or water electrolysis action at the water electrolysis portion can be carried out efficiently.

Figure 1:
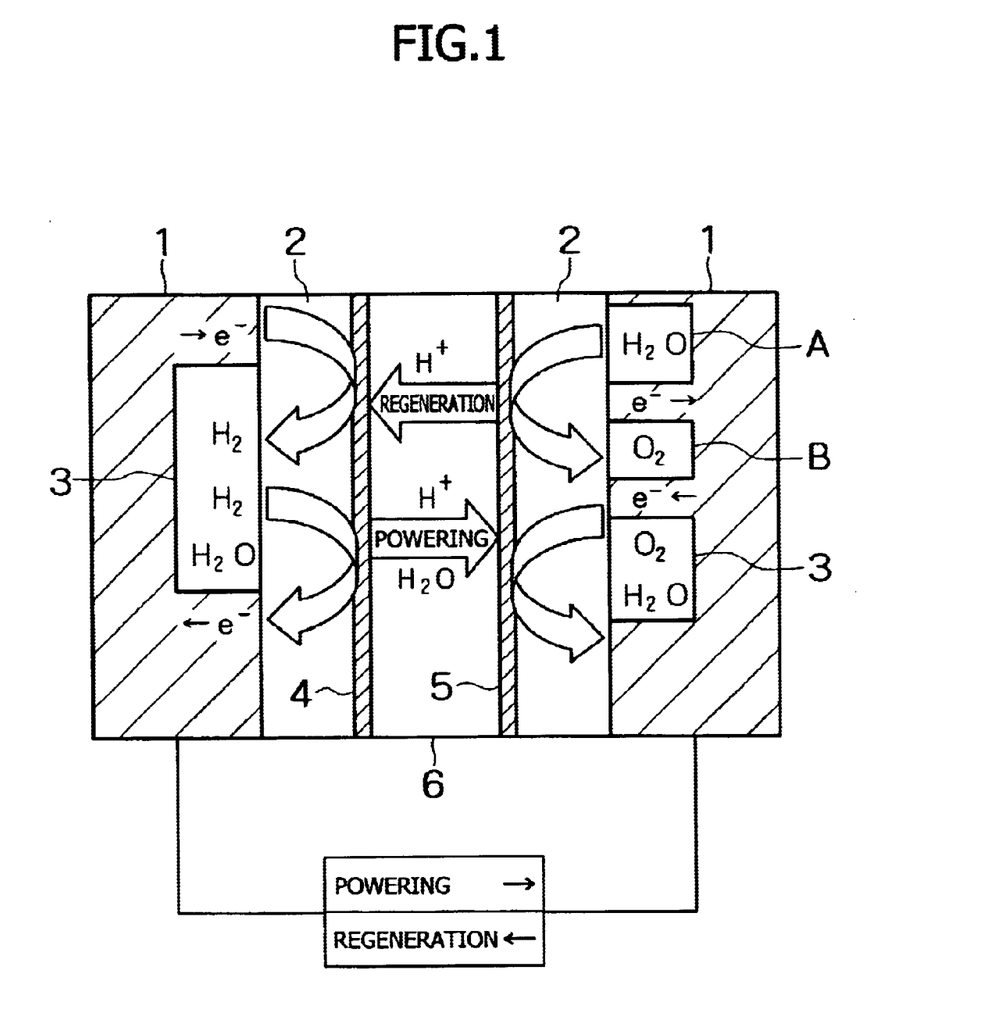
FIG. 1 is a cross-sectional view illustrating one constitution example in a unit cell which is a fundamental component of the fuel cell of the present invention.
Figure 5:
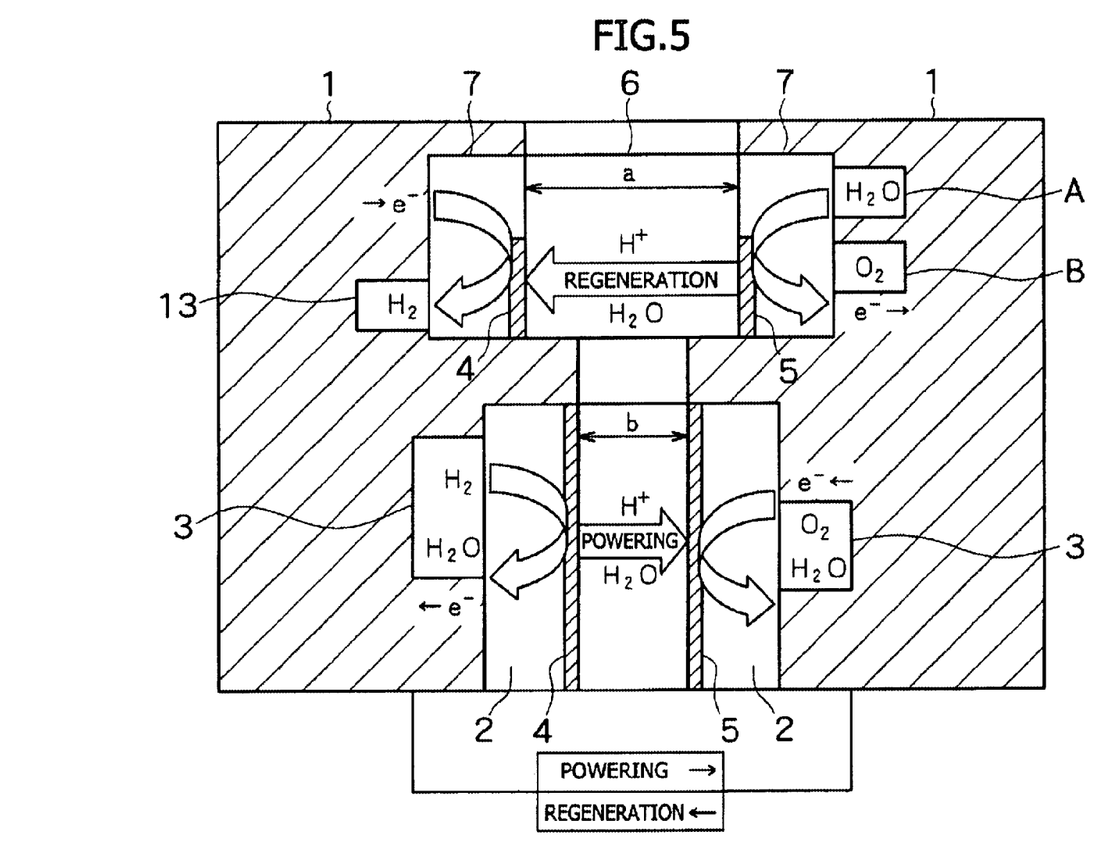
FIG. 5 is a cross-sectional view illustrating a preferable constitution example in a unit cell which is a fundamental component of the fuel cell of the present invention.

In FIG. 1, illustrated is a fundamental schematic construction of the unit-cell structure according to the present invention, while in FIG. 5, illustrated is a schematic constitution of one preferable unit-cell structure example according to the present invention.

Disposal of a water passage A on the oxygen electrode 5 side of the interconnectors 1 to be stacked makes it possible to impart the unit cell with both functions of a fuel cell and water electrolysis. Upon electrolysis of water, a hydrogen gas thus generated flows into the gas passage 3 or hydrogen passage 13, while oxygen flows into the oxygen/air passage and water passage. The oxygen is generated mainly in the oxygen gas passage B permitting passage of oxygen/air because of pressure.

In the present invention, existence of a sufficient amount of water on the oxygen electrode 5 side enables electrolysis of water, whereby reactions as described below occur.

Whole cell: $H_2O \rightarrow H_2 + \tfrac{1}{2}O_2$

Hydrogen electrode: $2H^+ + 2e^- \rightarrow H_2$

Oxygen electrode: $H_2O \rightarrow 2H^+ + e^- + \tfrac{1}{2}O_2$

Thus, water on the oxygen electrode 5 side is decomposed, and protons thus generated transfer through the membrane and generate a hydrogen gas at the hydrogen electrode 4. Thus, this reaction does not proceed without water on the oxygen electrode side 5. This reaction causes transfer of protons (H$^+$) through the membrane, and as a result, transfer of water by electroendosmosis occurs, which makes it possible to humidify the hydrogen gas itself.

In order to promote this reaction further, a catalyst necessary for power generation and electrolysis of water is prepared. As the diffusion layer 2 (called "power feeder") 7 for electrolysis of water) and the catalyst of a fuel cell, usually employed are carbon paper and platinum or platinum alloy borne on carbon particles, respectively. It is however difficult to use carbon for electrolysis of water because of a problem in oxidation resistance. With regards to the catalyst, platinum is usable if it is not borne on a carrier made of carbon, but owing that it needs a high decomposition voltage, another catalyst tends to be used. A catalyst which permits progress of water electrolysis at a low voltage is used. Typical examples of the catalyst include iridium alloy and oxides for the oxygen electrode 5 (corresponding to the cathode of water electrolysis) and platinum black for the hydrogen electrode (corresponding to anode). It is possible for carbon paper or carbon cloth to decompose, materials such as nickel foam, titanium and stainless fiber sintered plate are preferred. A construction as illustrated in FIG. 5 is therefore preferred to permit a reversible reaction.

When the state of the diffusion layer 2 is taken into consideration, the thickness a (usually, about 50 to 100 $\mu$m) of the membrane 6 of the water hydrolysis portion is preferably greater than the thickness b (usually, about 20 to 50 $\mu$m) of the membrane of the fuel cell portion. The first reason is that when the membrane is thinner, a gas thus generated diffuses in the membrane, thereby making it impossible to obtain a predetermined gas. The second reason is that the membrane is scratched by a sharp surface of the power feeder, presumably causing short-circuit. It is possible to form these portions from a single membrane, which however increases the total thickness of the membrane, thereby impairing the performance of the resulting fuel cell. Use of respective membranes is therefore preferred.

Figure 6:
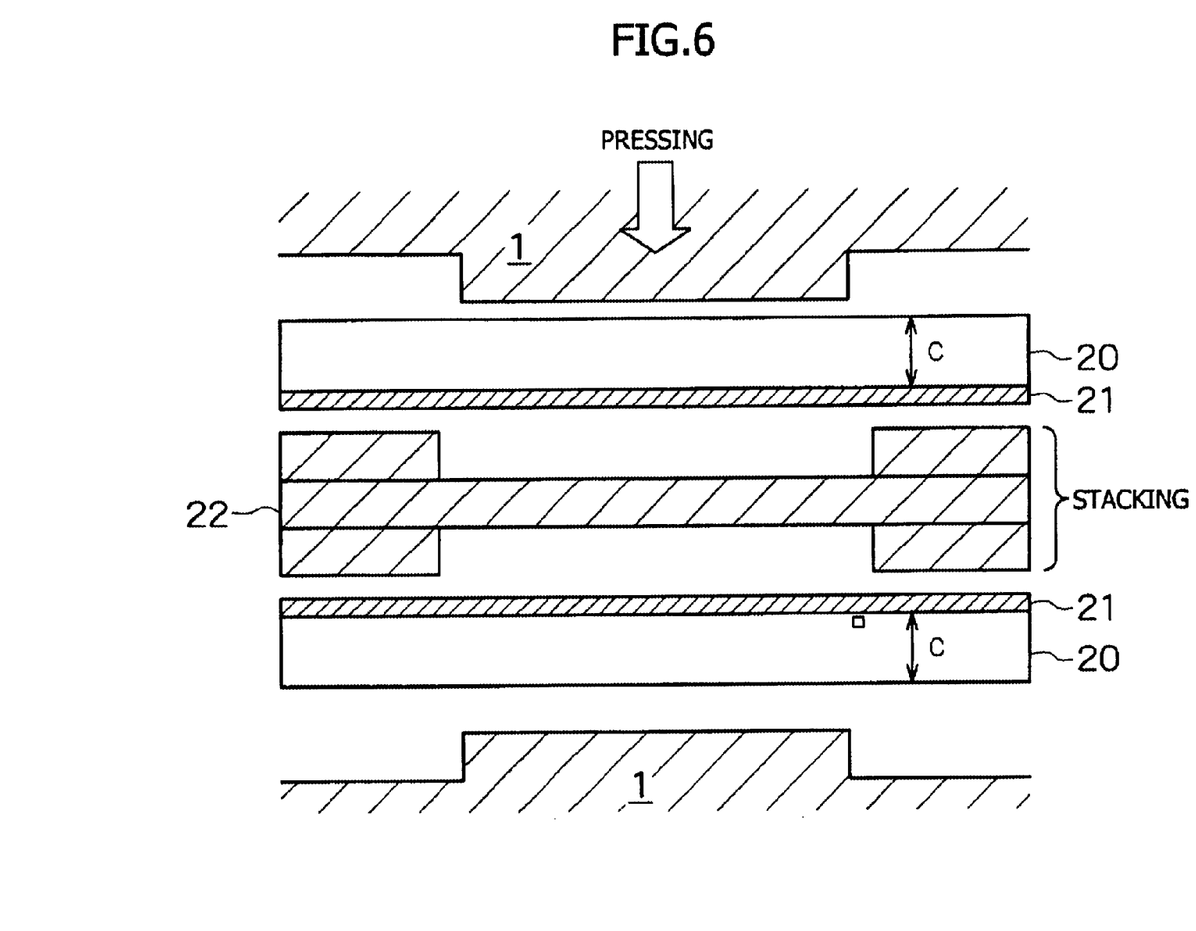
FIG. 6 illustrates one example of a pressing step upon production of the fuel cell of the present invention.
Figure 7:
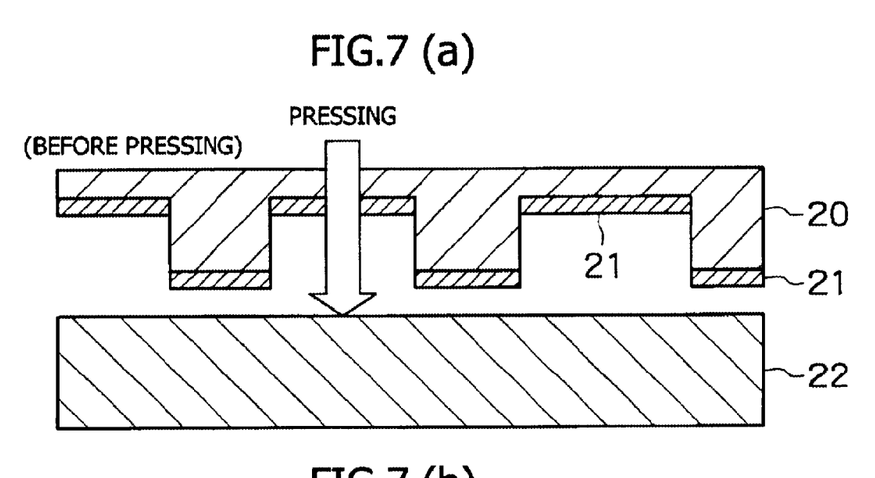
FIGS. 7(a) and 7(b) illustrate another example of a pressing step upon production of the fuel cell of the present invention.

If the membrane is not divided, it is formed to have different thicknesses. For example, by preparing through a step as illustrated in FIG. 6 or 7, a unit cell having both a water electrolysis portion and a fuel cell portion made of the same membrane can be provided. In the case where different catalysts are employed, they can be applied to desired sites of the membrane or diffusion layer (power feeder) respectively by the screen print method through slits shifted in the position.

Figure 8:
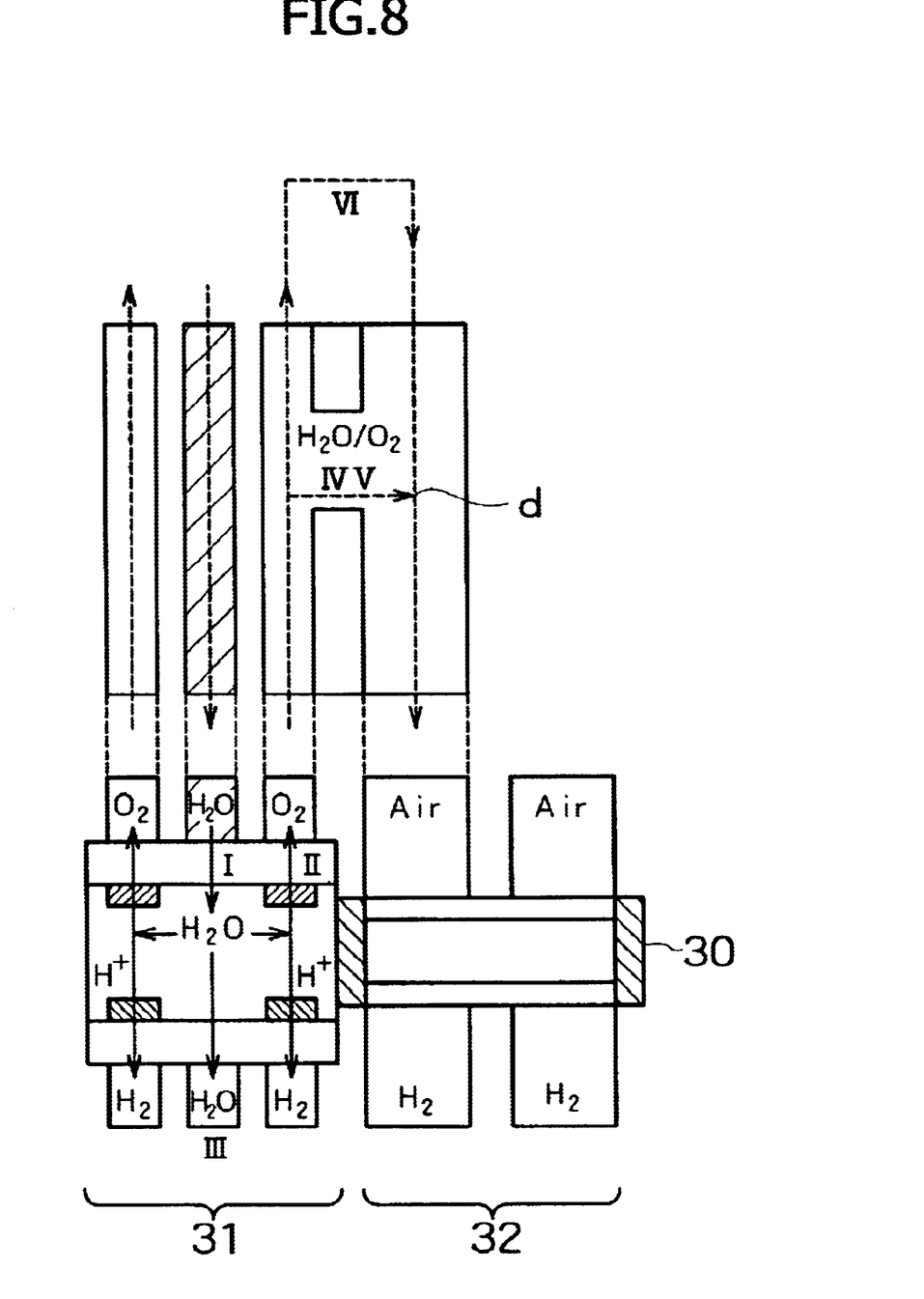
FIG. 8 schematically illustrates the action of the fuel cell of the present invention upon regeneration.
Figure 9:
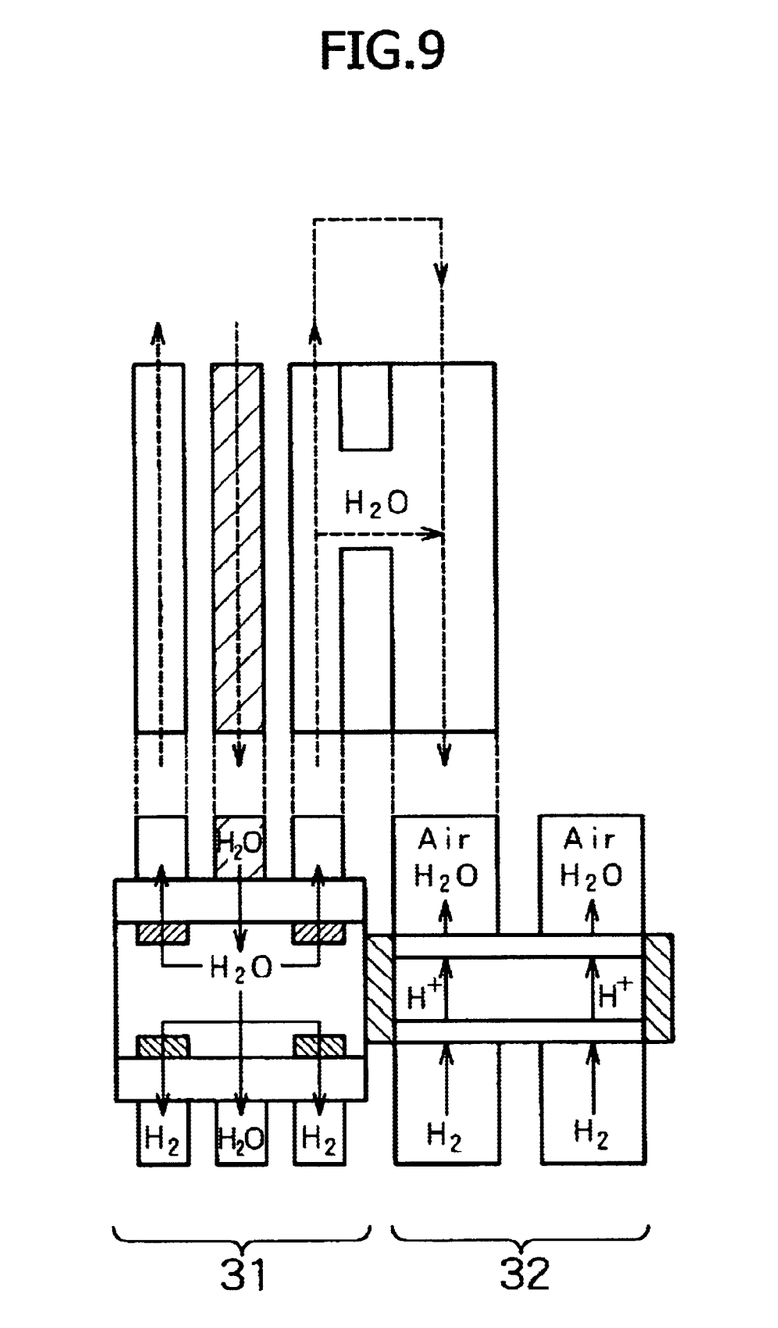
FIG. 9 schematically illustrates the action of the fuel cell of the present invention upon powering.

FIG. 8 is a schematic view illustrating the action of the fuel cell of the present invention upon regeneration, while FIG. 9 is a schematic view illustrating its action upon powering.

(i) The water passage disposed on the oxygen electrode side is fed with water. Water wets the membrane and at the same time, brings about homogenizing effects of an in-plane temperature distribution of the cell owing to heat exchange with the outside.

(ii) The water passage includes an air/oxygen passage which does not take part in a battery reaction. Along this passage, a catalyst for electrolysis has been applied onto a membrane. Electrolysis of water selectively occurs on the catalyst which faces this passage according to the difference in a reaction potential.

(iii) Disposal of a hydrogen passage on the side of the hydrogen electrode opposite to the water passage side facilitates humidification of a hydrogen gas.

(iv) The air fed with oxygen in (ii) may be humidified and sent to the electrode side of the fuel cell. Humidification degree is controlled, depending on the length or temperature of the air/oxygen passage. Humidification is suppressed by shortening the passage or lowering the water/cell humidity, while sufficient humidification may be accomplished by the operation contrary to this. The confluence d is determined freely, depending on operating conditions. For example, when highly humid air is introduced, a current density rises in the vicinity of the inlet, temporarily causing drying of the membrane. Intermittent feeding of such air may be employed in such a case. Dry air having a large flow rate is introduced at the inlet because its humidity is least at the inlet. Feeding to a site of large heat evolution or a high cell temperature is also effective.

(v) The air passage is connected or merged with the passage in the fuel cell, whereby electricity is generated.

(vi) Power generation (powering) and electrolysis (regeneration) do not occur simultaneously so that a detour may be set up to absorb the time lag, thereby making use of oxygen and hydrogen generated upon regeneration.

Figure 10:
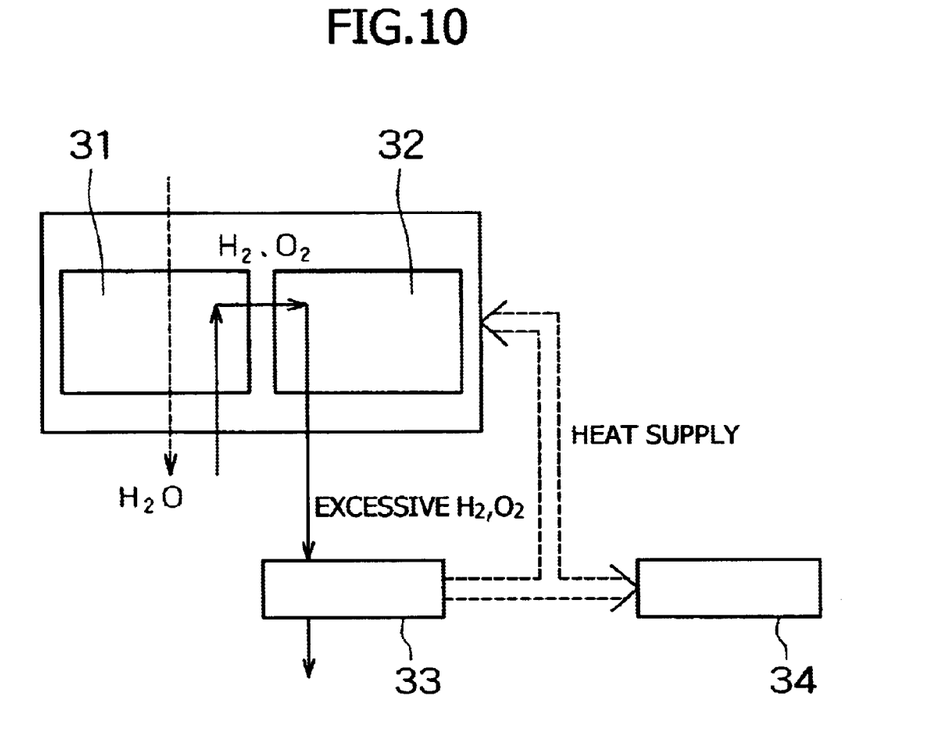
FIG. 10 schematically illustrates the constitution of one example of the fuel cell system of the present invention.

Oxygen and hydrogen thus generated cannot always be used, which depends on the timing of regeneration/powering. In this case, use of them, as illustrated in FIG. 10, by a catalyst combustor downstream of the fuel cell is effective. This apparatus is used for maintaining the temperature of a fuel cell or as a heat source of a hydrogen reservoir for causing endothermal reaction upon release of hydrogen including MH.

Figure 11:
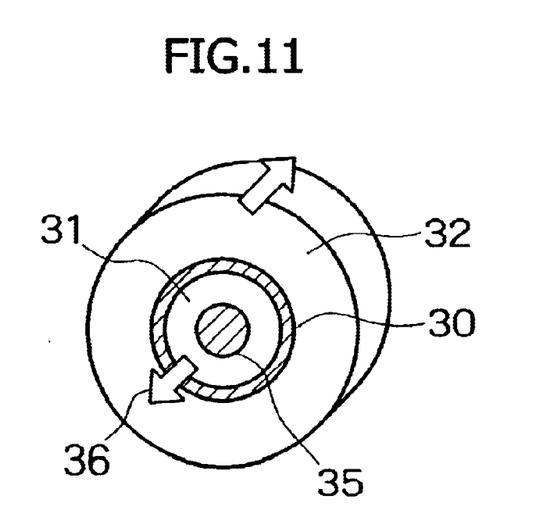
FIG. 11 is a schematic cross-sectional view illustrating the constitution of another example of the fuel cell of the present invention.
Figure 12:
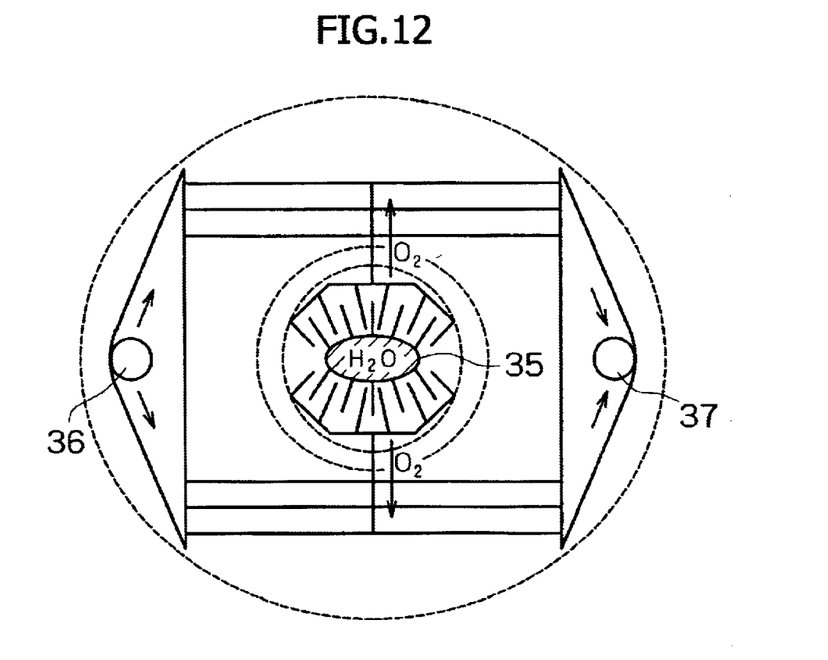
FIG. 12 schematically illustrates one example of a gas flow on the oxygen electrode side in a unit cell constituting the fuel cell.
Figure 13:
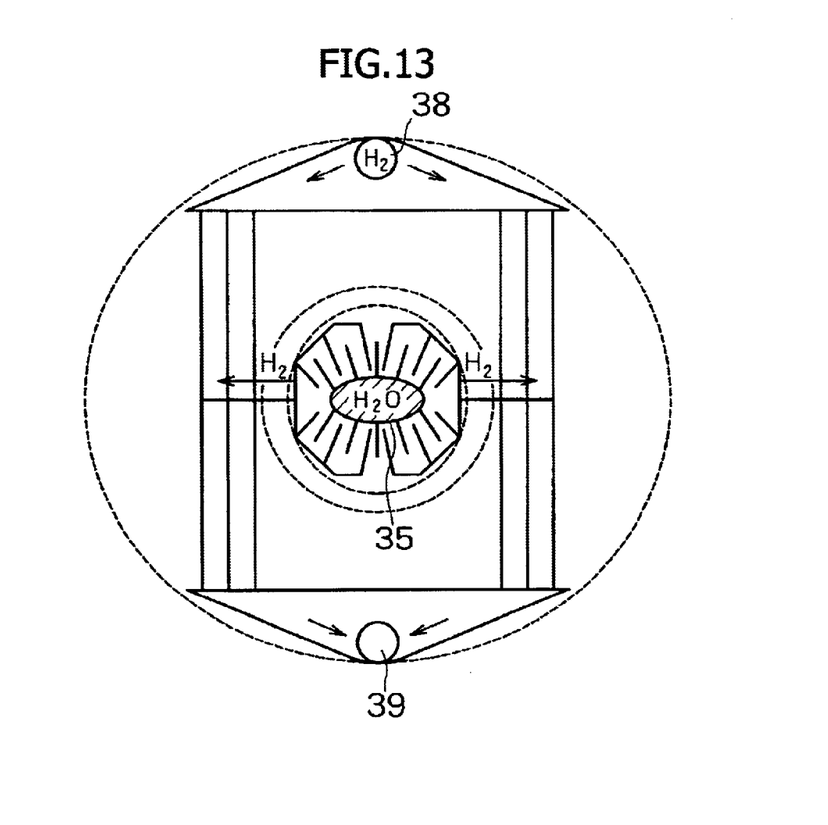
FIG. 13 schematically illustrates one example of a gas flow on the hydrogen electrode side in a unit cell constituting the fuel cell.

FIG. 11 is a schematic view illustrating the constitution of another embodiment of the fuel cell according to the invention.

Since the temperature becomes highest at the center of the cell, it is preferred to dispose the water passage 35 so as to put water through the center of the cell if cooling effect by water is taken into consideration. The water passage is surrounded by a water electrolysis portion 31 and at the periphery thereof, a fuel cell portion 32 is disposed.

Even if a gas passage or water passage is disposed outside the electrode surface like a typical layout example of a fuel cell, a water electrolysis portion can be formed only at the periphery of the water passage. A gas thus generated can be allowed to pass through a passage in the plane and sent to a gas passage (distributor) between unit cells.

In the fuel cell of the present invention, a sealing portion is usually formed so as to prevent free flow of water from the water distributor into the electrode surface or the electrolysis portion can be disposed at a place, which is otherwise a dead space, between the sealed surface and passage hole of the water distributor. It is therefore possible to constitute a reversible cell without impairing the electrode area so much compared with the conventional design of the fuel cell.

Figure 14:
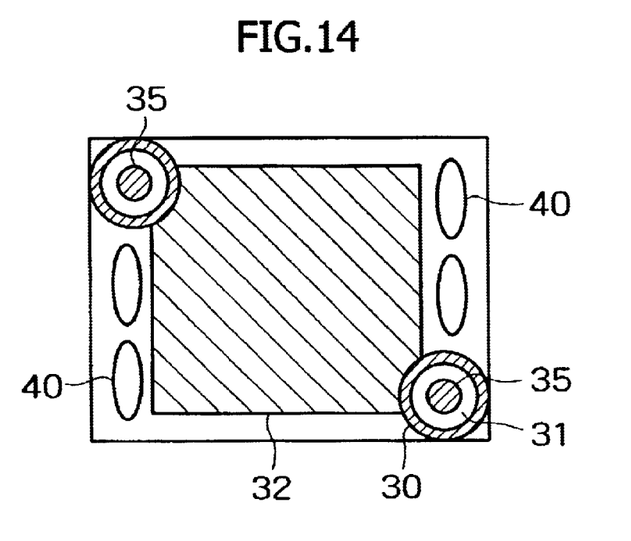
FIG. 14 schematically illustrates one constitution example on the plane of a unit cell constituting the fuel cell.

The unit cell of the invention fuel cell may have a planar shape as illustrated in FIG. 14 wherein the passage of gas or water is disposed on the outside. In this case, the water electrolysis portion is placed at the periphery of the water passage.

Figure 15:
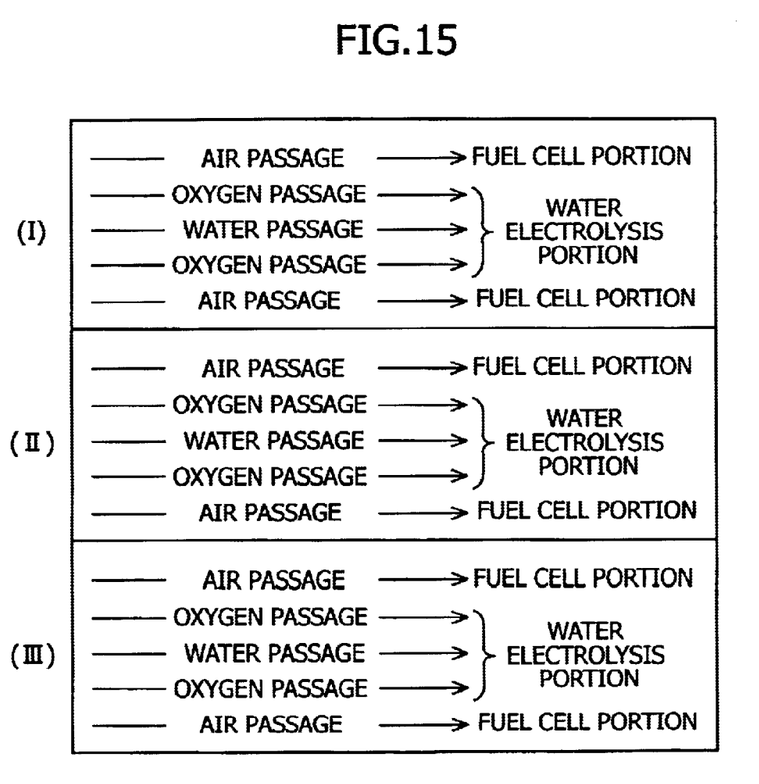
FIG. 15 illustrates one constitution example of a parallel-channel type fuel cell.

It is possible to design a simple fuel cell as described in FIG. 15, wherein a combination of air passage for fuel cell, air passage for electrolysis, water passage, air passage for electrolysis and air passage for fuel cell is disposed in repetition in the parallel flow channel. This layout enables uniform cooling in the cell plane.

In the fuel cell of the present invention, unit cells having a proton exchange membrane 6 disposed therein as described above are employed as a fundamental constitution and a stack is formed by stacking these unit cells one after another while interposing therebetween an interconnector 1. They are adhered each other by contact bonding press or the like. A plurality of the unit cell/interconnector combinations are stacked into a fuel cell stack. When one cell has an electromotive power of 1 V, for example, a stack formed of 100 unit cells generates about 100 V of power.

This interconnector 1 is required to have, as a principal performance, electron conductivity permitting transfer of electrons. Since the present invention aims at electrolysis of water inside of the fuel cell system, use of a carbon material having low oxidation resistance is not preferred similar to the diffusion layer 2 (power feeder 7) and, for example, a metal plate is preferred.

In addition, it must be equipped with a gas passage 3 for feeding hydrogen and oxygen to the electrode of the fuel cell portion. On one side of the interconnector 1, that is, a side to be brought into contact with the hydrogen electrode 4, a gas channel 3 for feeding hydrogen is equipped, while on the other side, that is, the side to be brought into contact with the oxygen electrode 5, a gas passage 3 for feeding oxygen is equipped. These gas passages 3 make it possible to allow gases to flow therethrough, thereby supplying the hydrogen electrode 4 and oxygen electrode 5 with a fuel gas and oxidizing gas, respectively. The thickness of the interconnector 1 is determined as needed, but is usually about 1.0 to 3.0 mm.

As an oxidizing gas, air can usually be introduced as it is. The fuel gas can be fed by various methods and no particular limitation is imposed thereon. For example, usable is a method of converting a raw material such as methanol into hydrogen in accordance with water vapor modifying reaction by using a hydrogen producing apparatus and supplying the resulting hydrogen after purification through a hydrogen purifying apparatus or the like.

In the conventional fuel cell system, an electrolysis cell and fuel cell are separately formed, and therefore the fuel cell system inevitably has a large size, whereas in the fuel cell according to the present invention, a binding plate for fixing a stack, a terminal, a chassis and a gas passage portion are each common to both electrolysis cell and fuel cell portions so that a compact fuel cell system can be provided. Moreover, adoption of water electrolysis makes it possible to collect a regenerative current in the present invention so that a battery or accumulator such as ultra capacitor with which the conventional fuel cell must be equipped is not necessary or can be reduced in size. Owing to a decrease in the number of accessories, the space or cost of the fuel cell system can be reduced.

The embodiments of the present invention have so far been described. They are provided only for facilitating the understanding of the present invention but not for limiting the scope of the present invention.

What is claimed is:

1. A polymer electrolyte fuel cell including a plurality of unit cells stacked one after another, wherein each unit cell comprises a water electrolysis portion and a fuel cell portion disposed within a single plane of the unit cell; an oxygen electrode is disposed on one side of a proton exchange membrane and a hydrogen electrode is disposed on the other side in the stacking direction of the unit cells; diffusion layers are disposed on the outside of the electrodes so as to allow electrons which have been generated on a catalyst to pass therethrough; interconnectors are disposed on an outside of the diffusion layers so to feed a gas to the fuel cell portion; and a water passage is disposed in an interconnector next to the oxygen electrode so as to feed water to the water electrolysis portion.

2. A fuel cell of claim 1, wherein the interconnector next to the oxygen electrode has, disposed adjacent to the water passage, oxygen gas passage for receiving oxygen generated in the water electrolysis portion.

3. A fuel cell of claim 2, wherein the interconnector next to the hydrogen electrode has a hydrogen gas passage for receiving hydrogen generated at the water electrolysis portion.

4. A fuel cell of claim 3, wherein at the water electrolysis portion, the oxygen electrode is disposed not between the water passage and proton exchange membrane but between the oxygen gas passage and proton exchange membrane, while the hydrogen electrode is disposed between the hydrogen gas passage and the proton exchange membrane.

5. A fuel cell of claim 3, wherein the hydrogen gas passage is connected with a gas passage on the hydrogen electrode side so as to feed gas to the fuel gas portion.

6. A fuel cell of claim 2, wherein the oxygen gas passage is disposed between the water passage and the gas passage for feeding the fuel cell portion with a gas.

7. A fuel cell of claim 2, wherein the oxygen gas passage is connected with a gas passage on the oxygen electrode side for feeding the fuel cell portion with a gas.

8. A fuel cell of claim 1, wherein the proton exchange membrane has two functionally separated portions of the water electrolysis portion and the fuel cell portion disposed in the single plane of the unit cell, and the proton exchange membrane at the water electrolysis portion is thicker than that at the fuel cell portion.

9. A fuel cell of claim 1, wherein the water passage and the gas passage for feeding the fuel cell portion with a gas are disposed not adjacent each other.

10. A fuel cell of claim 1, wherein the interconnectors are each made of a metal plate.

11. A fuel cell system comprising:

a polymer electrolyte fuel cell including a plurality of unit cells stacked one after another, wherein each unit cell comprises a water electrolysis portion and a fuel cell portion disposed within a single plane of the unit cell, an oxygen electrode is disposed on one side of a proton exchange membrane and a hydrogen electrode is disposed on the other side in the stacking direction of the unit cells, diffusion layers are disposed on the outside of the electrodes so as to allow electrons which have been generated on a catalyst to pass therethrough, interconnectors are disposed on an outside of the diffusion layers so as to feed a gas to the fuel cell portion, and a water passage is disposed in an interconnector next to the oxygen electrode so as to feed water to the water electrolysis portion; and a catalyst combustor disposed downstream of the fuel cell so that a portion or whole of gas which has been generated at the water electrolysis portion can be fed to the catalyst combustor.

* * * * *